United States Patent [19]

Pinkston et al.

[11] Patent Number: 5,006,400

[45] Date of Patent: Apr. 9, 1991

[54] PRINTING BLANKET CONSTRUCTION HAVING NONTEXTURED SURFACE

[75] Inventors: Melvin D. Pinkston, Waynesville; Andrew J. Gaworowski, Asheville; Stephen B. Edwards, Hazelwood, all of N.C.

[73] Assignee: Day International, Dayton, Ohio

[21] Appl. No.: 282,387

[22] Filed: Dec. 9, 1988

[51] Int. Cl.$^5$ .................. B32B 7/00; D03D 15/00
[52] U.S. Cl. ................... 428/229; 428/909; 428/318.4; 428/319.3; 428/261
[58] Field of Search ............ 428/909, 229, 318.4, 428/319.3, 261

[56] References Cited

U.S. PATENT DOCUMENTS

| | | | |
|---|---|---|---|
| 2,064,780 | 12/1936 | Calvert | 154/54.5 |
| 3,147,698 | 9/1964 | Ross | 101/149.2 |
| 3,795,568 | 3/1974 | Rhodarmer et al. | 101/453 |
| 3,983,287 | 9/1976 | Goossen et al. | 428/241 |
| 4,425,398 | 1/1984 | Berczi | 428/253 |
| 4,471,011 | 9/1984 | Sporing | 428/68 |
| 4,603,631 | 8/1986 | Simeth | 101/229 |
| 4,751,127 | 6/1988 | Pinkston et al. | 428/141 |

Primary Examiner—George F. Lesmes
Assistant Examiner—Terrel H. Morris
Attorney, Agent, or Firm—Killworth, Gottman, Hagan & Schaeff

[57] ABSTRACT

A unitary printing blanket construction which requires no packing when installed and which has a nontextured, low abrasion base surface contacting the blanket cylinder so that the pressures to which the blanket is subjected are spread substantially over the entire surface of the blanket in contact with the blanket cylinder is provided. The laminated printing blanket construction includes at least one base ply and a surface layer laminated to one surface thereof. The opposite surface of the base ply is substantially nontextured such that, when mounted on a blanket cylinder, the pressures to which the blanket is subjected are spread substantially over the entire surface of the blanket in contact with the cylinder. The printing blanket is particularly useful when used in conjunction with a metal-plated blanket cylinder.

1 Claim, 2 Drawing Sheets

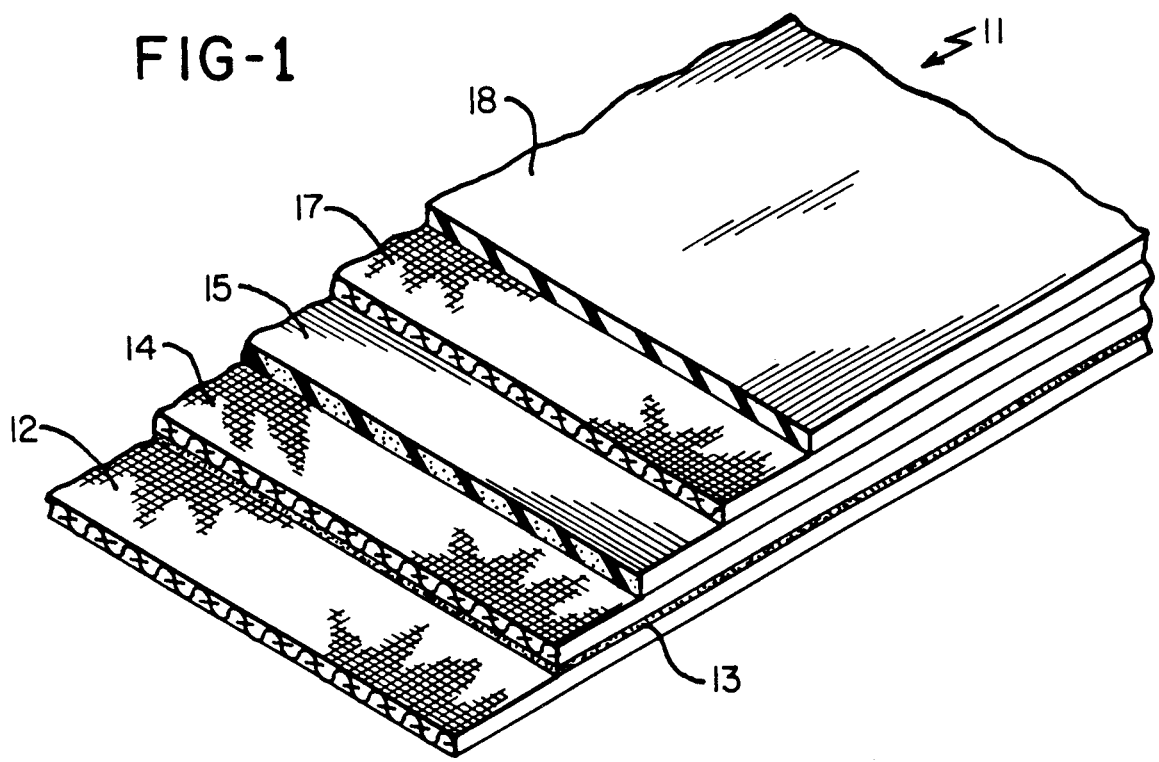
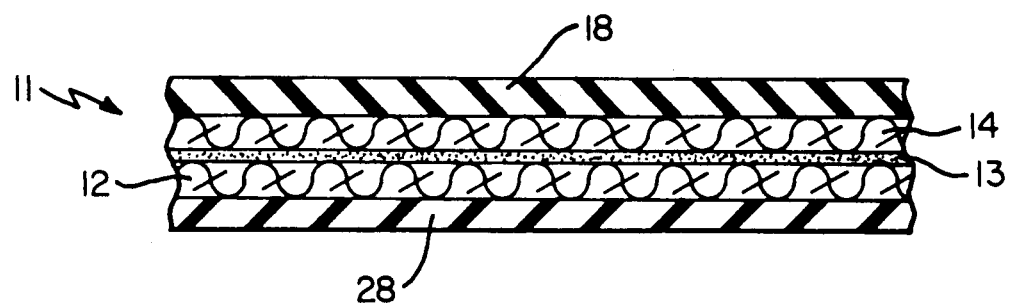

Warp Direction

Warp Direction

PRINTING BLANKET CONSTRUCTION HAVING NONTEXTURED SURFACE

BACKGROUND OF THE INVENTION

This invention relates to a printing blanket construction, and more particularly to a printing blanket construction having a relatively smooth, nontextured, low abrasion base surface which contacts the cylinder on which the blanket is mounted. The type of blanket referred to herein is used primarily in offset lithographic printing, but may also find utility in other fields of printing.

In offset lithography, a rotary cylinder is covered with a printing plate which normally has a positive image area receptive to oil-based inks and repellent to water and a background area where the opposite is true. The printing plate is rotated so that its surface contacts a second cylinder covered with a rubber-surfaced ink-receptive printing blanket. The ink present on the image surface of the printing plate transfers, or offsets, to the surface of the blanket. Paper or other sheet stock to be printed is then passed between the blanket-covered cylinder and a rigid back-up cylinder to transfer the image from the surface of the blanket to the paper.

During the step in which the image is transferred from the plate to the blanket and the step where the image is transferred from the printing blanket to the paper, it is important to have intimate contact between the two contacting surfaces. This is ordinarily achieved by positioning the blanket-covered cylinder and the supporting cylinder it contacts so that there is a fixed interference between the two so that the blanket is compressed throughout the run to a fixed depth, typically approximately 0.002 to 0.006 inches. It is important that this compression be maintained uniformly over the entire surface of the blanket.

Conventionally, this fixed interference is accomplished by inserting one or more thin layers of paper or the like between the blanket and the surface of the cylinder to build up the thickness of the blanket. This process is known as packing a blanket. This process presents problems however in that the packing procedure is time consuming, resulting in down time for the printing equipment. Further, once positioned on the cylinder, the packing paper tends to slide, slip, and/or fold which may render the blanket surface nonuniform and resulting in poor printing results. Further, when a blanket must be replaced, the time consuming packing operation must be repeated for a new blanket.

So-called "no pack" blankets have been developed to provide a fixed interference without the need to pack the blanket. No pack blankets are manufactured to very precise gauges so that they can be installed directly onto a cylinder with the correct amount of interference. These blankets have the advantage of a one-piece construction which requires no positioning of packing paper beneath the blanket. This results in less down time for the printing equipment when an old blanket is removed and replaced with a new blanket.

Such no pack blankets, like most printing blankets, are normally composed of a base material which gives the blanket dimensional stability. Presently most, if not all, commercial printing blankets use woven fabrics for the base material. The base may consist of one or more layers of such fabric. The working surface of the blanket which contacts the ink is typically an elastomeric layer of natural or synthetic rubber which is applied over the base layer or layers. The base layer or layers and working surface are laminated together using suitable adhesives.

In offset lithography as well as other printing operations, the printing plate and blanket cylinders are subject to corrosion and rust because of exposure to inks, water, and chemicals used in cleaning up the machinery. To combat such problems, these cylinders have typically been plated with chrome or nickel. These metals provide a surface that is not only corrosion resistant, but also ink repellent.

However, such nickel- and chrome-plated cylinders have not worked well in conjunction with no pack blankets. After only short periods of use, nickel is removed from the cylinder surface to such an extent that uncoated steel is exposed. While chrome plating is more resistant to removal than nickel, it too is subject to wear. The areas on the cylinder surface where the plated metal is removed are then subject to rapid corrosion and/or oxidation. Some have speculated that the nickel or chrome is removed by corrosion from chemicals which wick around the edges of the printing blanket. Others have speculated that the metal removal is caused by electrical charges building up from the friction between the blanket and cylinder.

Some attempts have been made to eliminate the removal of metal platings. For example, Sporing, U.S. Pat. No. 4,471,011 provides a thin rubber coating on the base of a printing blanket to restrict the wicking of solvents and other chemicals beneath the blanket. Others have applied lubricants to the blanket cylinder to prevent such solvents and chemicals from contacting the blanket cylinder. Neither of these attempted solutions has done more than to slow down the removal of metal, and the application of lubricants must be repeated each time a blanket is changed.

In any event, it would be desirable to be able to use no pack blankets, with their attendant advantages, on such plated cylinders. Accordingly, the need exists in the art for a no pack printing blanket which can be used successfully in conjunction with a nickel or other corrosion resistant plated cylinder.

SUMMARY OF THE INVENTION

The present invention meets that need by providing a unitary printing blanket construction which requires no packing when installed and which has a nontextured, low abrasion base surface contacting the blanket cylinder so that the pressures to which the blanket is subjected are spread substantially over the entire surface of the blanket in contact with the blanket cylinder. In this manner, the metal plated surface of the cylinder is not subject to metal removal as with previous printing blanket constructions. In accordance with one aspect of the present invention, a laminated printing blanket construction is provided which includes at least one base ply and a surface layer laminated to one surface thereof. The opposite surface of the base ply is substantially nontextured such that, when mounted on a blanket cylinder, the pressures to which the blanket is subjected are spread substantially over the entire surface of the blanket in contact with the cylinder.

The base ply may comprise any of a number of suitable materials. For example, the base ply may be a woven fabric with the exterior surface thereof being ground to remove the weft threads where they cross over the warp threads. This provides a relatively smooth, nontextured, low abrasion surface which is in substantially complete contact with the blanket cylinder when installed thereon. This is in sharp contrast to typical prior printing blanket constructions in which only the fabric nodes (i.e., points of crossover between weft and warp threads) actually contacted the cylinder surface. Typically, such areas of contact would comprise only approximately 20% of the total surface area of the blanket.

The base ply may also comprise other materials which provide a relatively smooth, nontextured, low abrasion surface such as a nonwoven fabric or felt or a coating of a natural or synthetic resin. Where a coating of a resin is used, the thickness of the coating should be such that the woven fabric surface texture of any base ply fabric is substantially completely covered.

In another embodiment of the invention, a laminated printing blanket construction is provided including at least one base ply of a woven fabric and a surface layer laminated to one surface thereof. The exterior surface of the base ply is ground to be substantially nontextured such that, when mounted on a blanket cylinder, the pressures to which the blanket is subjected are spread substantially over the entire surface of the blanket in contact with the cylinder. The printing blanket may be initially fabricated to a thickness which is in excess of the final required thickness. This grinding step may be done first, followed by the grinding of the top working surface layer to provide a final blanket construction of the precise thickness (gauge).

In another embodiment of the invention, a laminated printing blanket construction is provided including at least one base ply of a woven fabric and a surface layer laminated to one surface thereof. The opposite surface of the base ply is coated with a natural or synthetic resin to provide a substantially smooth, nontextured surface such that, when mounted on a blanket cylinder, the pressures to which the blanket is subjected are spread substantially over the entire surface of the blanket in contact with the cylinder.

It has been found that the use of printing blankets having woven fabric base plies mounted directly onto metal-plated blanket cylinders causes removal of metal through an abrasion process of the fiber nodes rubbing against the cylinder surface. Because a typical blanket base ply is in contact with the blanket cylinder surface over only approximately 20% or its surface area at the fiber nodes where warp and weft threads crossover, the pressures to which the printing blanket is exposed are concentrated in these areas of contact. By providing a relatively smooth, nontextured base ply surface for the printing blanket, the blanket is in substantially complete contact with the cylinder surface, and the pressures to which the blanket is subjected are spread over substantially the entire surface of the blanket in contact with the cylinder.

Accordingly, it is an object of the present invention to provide a unitary printing blanket construction which requires no packing when installed and which has a nontextured, low abrasion base surface contacting the blanket cylinder. This, and other objects and advantages of the present invention, will become apparent from the following detailed description, the accompanying drawings, and the appended claims.

BRIEF DESCRIPTION OF THE DRAWINGS

FIG. 1 is an isometric view of a segment of the printing blanket of the present invention;

FIG. 4 is a fragmentary cross-sectional view of another embodiment of the invention.

DESCRIPTION OF THE PREFERRED EMBODIMENT

Figure 2:
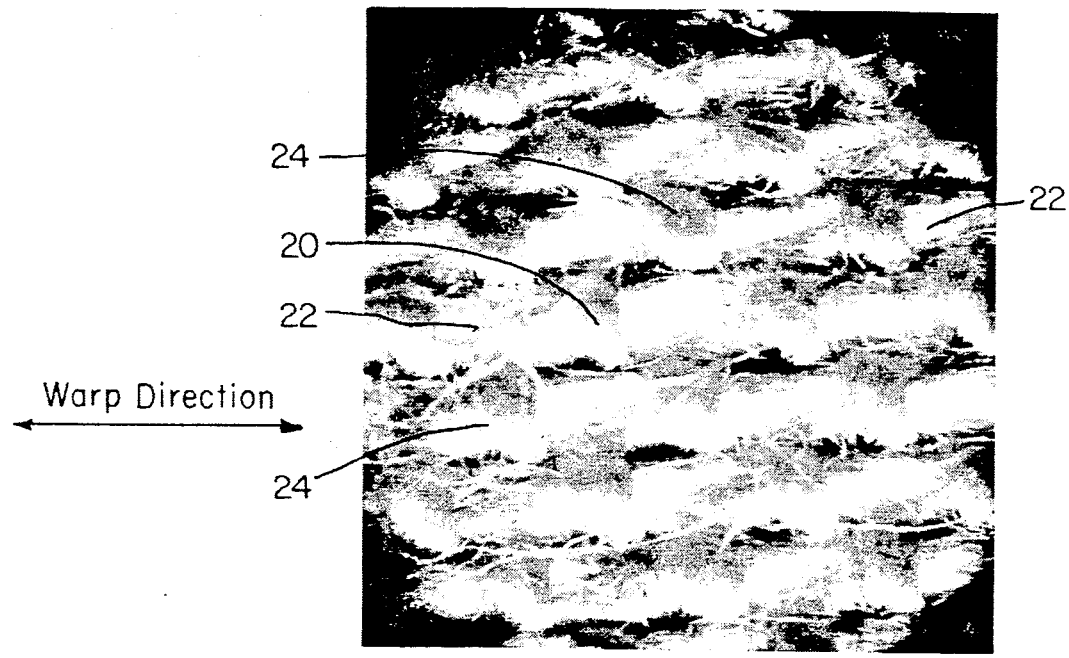
FIG. 2 is an enlarged photograph of the exterior fabric surface of a base ply on a typical prior art printing blanket with the wrap direction of the fabric shown.

The printing blanket 11 of the present invention is illustrated in FIG. 1 and comprises a base ply 12 of woven fabric. As is conventional in the art, an additional ply or plies of reinforcing fabric such as ply 14 are also included in the laminate construction. Typically, the fabric plies are low stretch fabrics such as certain types of cotton, rayon, or glass. In the normal manufacturing process, the plies are formed of a long band of fabric. Plies 12 and 14 may be bonded together by an adhesive layer 13 which may be a rubber cement such as a nitrile or neoprene rubber or other suitable adhesive material.

Optionally, the blanket may have a compressible intermediate layer 15 which may be formed by any of a number of conventional processing techniques. Another ply of fabric 17, similar in construction to plies 12 and 14 is positioned over compressible layer 15. Surface layer 18 is typically formed from any suitable polymeric material including both natural rubbers and synthetic resins. For example, some rubber compounds that have been used for forming surface layer 18 include acrylonitrile butadiene rubber, isobutylene isoprene elastomer, polysulfide rubber, ethylene propylenediene terpolymer, natural rubber, styrene butadiene rubber, and a blend of acrylonitrile-butadiene and polysulfide rubber.

Surface layer 18 may be formed in a conventional manner by mixing an unvulcanized rubber compound in a suitable solvent and subsequently knife coating the solution onto a fabric carcass such as fabric layer 17. Typically, the application is made in a plurality of thin coats, After each coat is applied, the solvent is allowed to evaporate so that the resultant rubber layer is substantially solvent free.

Printing blanket 11 is then heated for a suitable period of time to vulcanize or cure the unvulcanized rubber in the construction. Blanket 11 may be formed initially in a long roll or the like from which individual blankets may be cut to size.

Figure 3:
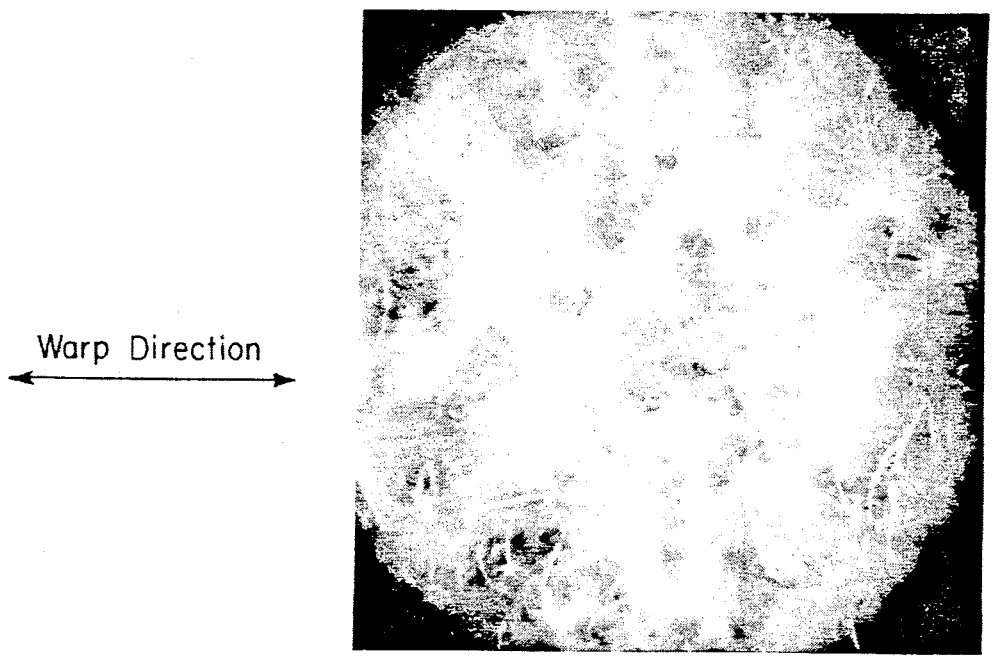
FIG. 3 is an enlarged photograph of the exterior fabric surface of a base ply on the printing blanket of the present invention with the warp direction of the fabric shown.

Shown in the photographs of FIGS. 2 and 3, with the warp direction of the fibers shown, are conventional printing blanket base layers, such as layer 12. The layer includes a woven fabric carcass which has both weft and warp fibers, 20 and 22, respectively. These weft fibers cross over the warp fibers at fabric node points 24 to form a textured surface. When this surface is wrapped around a blanket cylinder, the blanket will be supported on these fabric nodes 24 which may account for only approximately 20% of the total surface area of the blanket.

However, with the printing blanket of the present invention, this outer surface of the fabric carcass is ground to produce a relatively smooth, untextured surface as illustrated in FIG. 3. As can be seen, the fabric nodes have been removed such as by grinding. However, the carcass maintains its dimensional stability. When mounted on a blanket cylinder, the smooth, nontextured surface of the base layer of the blanket contacts substantially the entire surface of the blanket. Thus, utilizing the blanket of the present invention, the pressures to which the blanket is subjected are spread substantially across the entire surface of the blanket.

The grinding step to produce the nontextured surface of FIG. 3 may be carried out either prior to or after the blanket is cured. It may even take place prior to the various layers of the blanket being laminated together. However, it is preferred that the grinding step occur after curing of the blanket. In practice, the surface layer 18 on the blanket is built up to a thickness which provides the blanket with an overall thickness slightly in excess of its final desired gauge or thickness. Then, the fabric on base layer 12 is ground to provide the relatively smooth, nontextured surface. Finally, surface layer 18 is itself ground to provide the blanket with its final desired thickness.

Another embodiment of the invention is illustrated in FIG. 4. In that embodiment, base layer 12 is coated or otherwise laminated with a layer 28 of a natural or synthetic resin to provide an exterior surface which is substantially smooth and nontextured. As used in the context of the present invention, a natural or synthetic resin includes both natural rubber as well as synthetic elastomers. It also includes films or coatings of paints and/or adhesives.

Alternatively, layer 28 may be formed of a nonwoven fabric such as a felt to provide the nontextured surface which is to contact the blanket cylinder. Layer 28 may even take the form of a thin metal film adhered to the blanket construction. To insure that a substantially smooth and nontextured surface is presented, the thickness of layer 28 should be sufficient so that no fabric pattern from base layer 12 is exposed. The blanket construction shown in FIG. 4 may also optionally include an intermediate compressible layer (not shown).

Through the use of a fabric or film which has a relatively smooth, nontextured surface as the base ply of a printing blanket construction, removal of plated metals for the surface of the blanket cylinder in a printing operation is essentially eliminated. Such a surface may be achieved in accordance with the present invention by the removal of the fabric or textured pattern from conventional woven fabric base plies or by coating or otherwise laminating to such base plies a nontextured material surface.

While certain representative embodiments and details have been shown for purposes of illustrating the invention, it will be apparent to those skilled in the art that various changes in the methods and apparatus disclosed, herein may be made without departing from the scope of the invention, which is defined in the appended claims.

What is claimed is:

1. A laminated printing blanket construction comprising at least one base ply and a surface layer of polymeric material laminated to one surface thereof, and wherein said base ply is a woven fabric and the opposite surface of said base ply has been ground to remove weft threads where they cross over warp threads so that said opposite surface of said base ply is substantially nontextured such that, when mounted on a blanket cylinder, the pressures to which said blanket is subjected are spread substantially over the entire surface of said blanket in contact with said cylinder.

* * * * *